INVENTORS:
ROLF E. JAKOBSSON
KURT A. ANDERSSON
ATTORNEYS

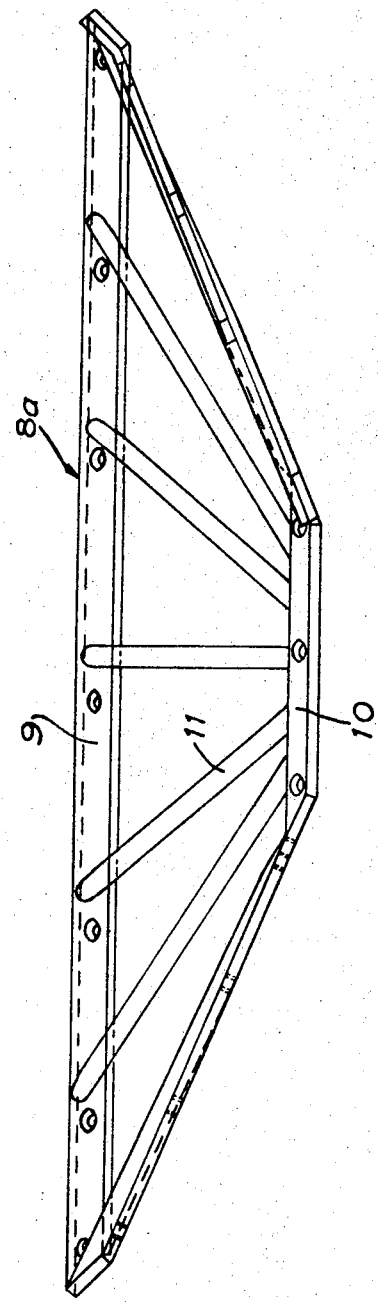

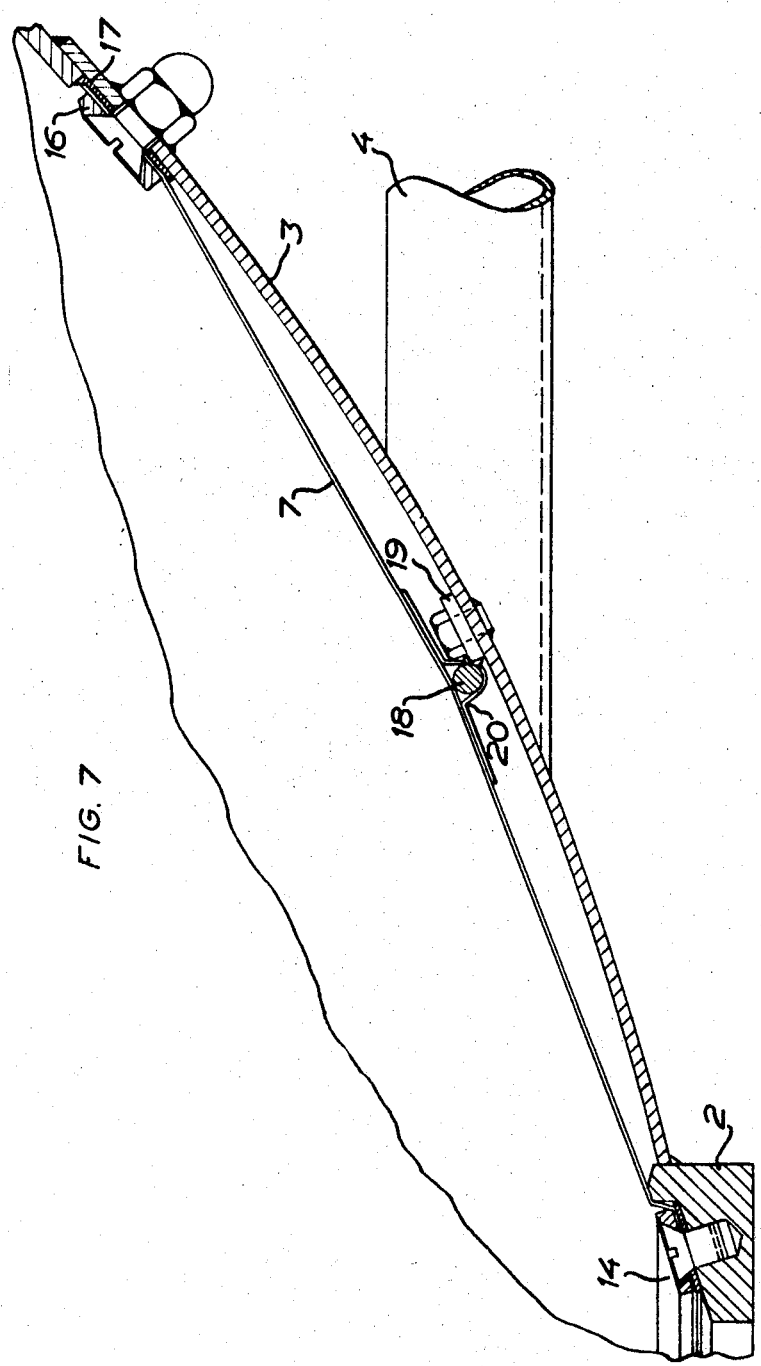

United States Patent Office
3,448,900
Patented June 10, 1969

3,448,900
CONTAINERS FOR THE TRANSPORT OF FLUIDIZABLE MATERIALS
Rolf Elis Jakobsson, Tvaaker, and Kurt Allan Andersson, Falkenberg, Sweden, assignors to Aktiebolaget Interconsult, Malmo, Sweden
Filed May 2, 1967, Ser. No. 638,183
Claims priority, application Sweden, May 4, 1966, 6,094/66
Int. Cl. B65g 3/12, 69/06, 53/04
U.S. Cl. 222—195                4 Claims

ABSTRACT OF THE DISCLOSURE

In a container for the transport of fluidizable, particulated or pulverized material a device comprising air permeable means at the output area of the container, said means being carried by and mounted on a frame by air permeable mounting means in such a way that the surface of the air permeable means is substantially smooth and the air permeable surface provided is substantially equal to the geometrical surface of the air permeable means and/or the frame.

---

Containers for the transport of fluidizable materials are provided, as is well known in this art, with air permeable means for fluidizing the material in the vicinity of the output area for facilitating unloading of the containers and especially for a faster unloading. In these prior-art containers the air permeable means is bolted directly to the bottom wall of the container or attached to a perforated plate or disc on the bottom of the container. In using these mounting methods ridges and crowns are formed at the air impermeable points of the surface of the air permeable means. These ridges are initially low but will be higher each time the container is loaded and unloaded and will at last lower the unloading speed of the container such that the container must be disassembled and rinsed, whereby the air permeable means may be damaged so that an exchange is required. All these drawbacks of presently known containers make especially the use of them rather costly accompanied by several environmental drawbacks during the handling of them.

These drawbacks of the prior-art devices described above are avoided by the present invention providing in a container for the transport of pulverized or particulated material a device comprising means permeable to air and mounted at an output area of said container, means in communication with said container for supply of air to said container through said air permeable means when the container is to be unloaded, whereby said particulated material is fluidized in the vicinity of said air permeable means and unloading is considerably facilitated, means for mounting said air permeable means on a frame, said mounting means being permeable to air and said frame comprising a first means mounted on a wall of said container above the level for said output area in said container, a second means mounted adjacent said output area and at least one means arranged between said first and second means and said frame is inclined to said output area of said container, whereby the surface of said air permeable means will be kept substantially smooth and the air permeable surface provided will be substantially equal to the geometrical surface of said air permeable means.

These features of the invention and the advantages gained thereby will become apparent from the following description, reference being made to the accompanying drawing which by way of example illustrates some embodiments of the invention.

Figure 1:
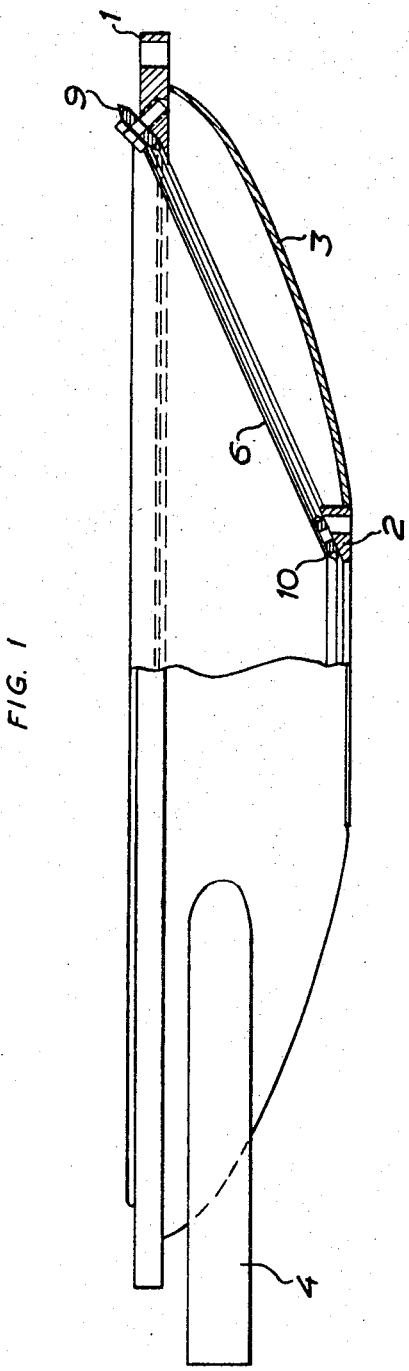
Figure 2:
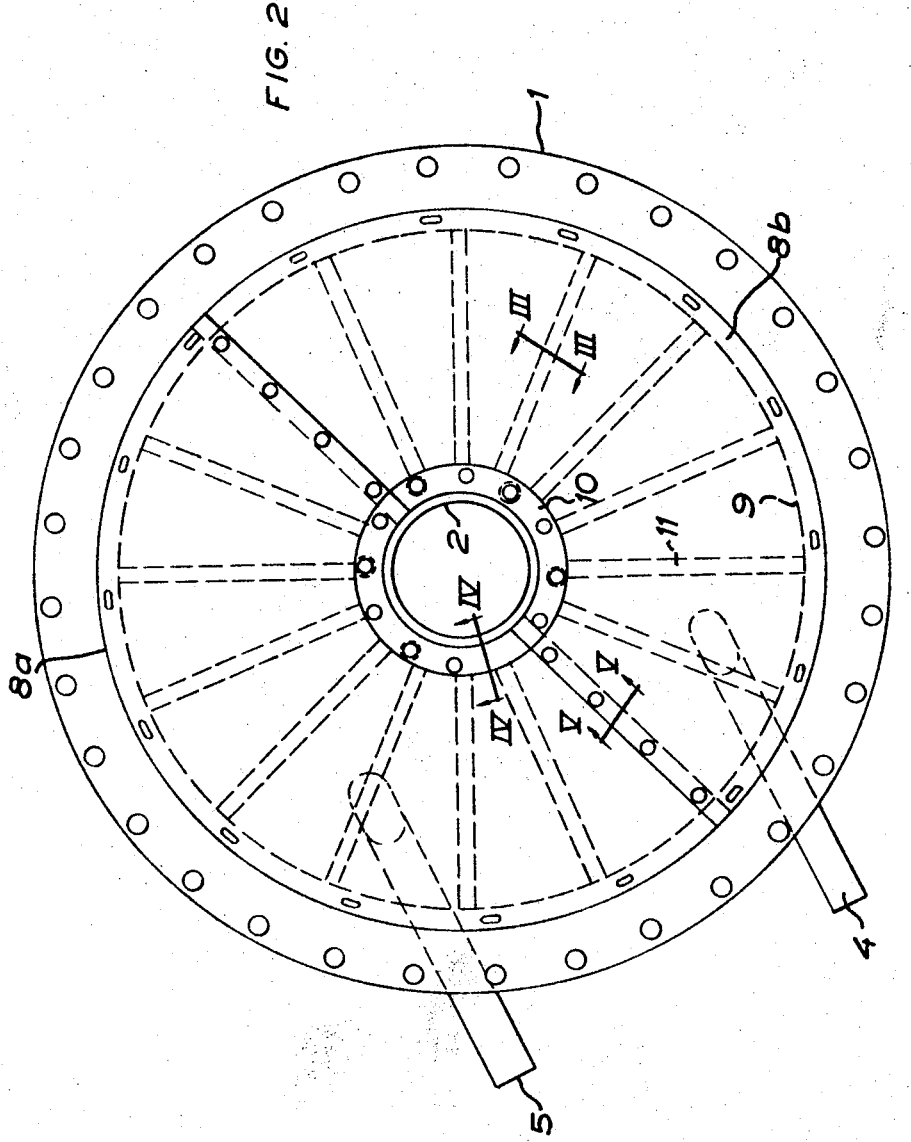
Figure 3:
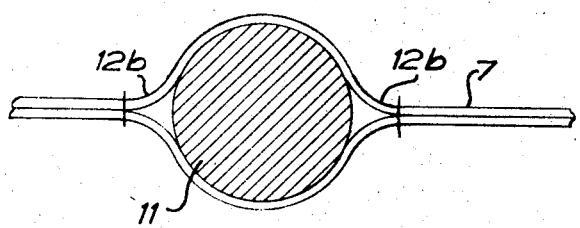
Figure 4:
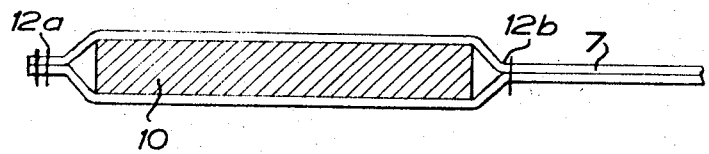
Figure 5:
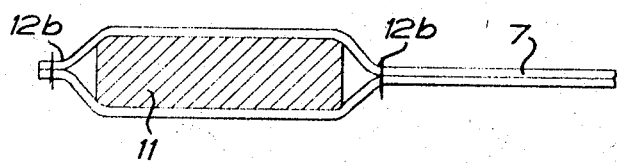

In the drawings:
FIGURE 1 is a side elevational view of the lower part or bottom part of a container, partly in section;
FIGURE 2 is a top plan view of the bottom part shown in FIGURE 1;
FIGURE 3 is a part section on line 3—3 in FIGURE 2;
FIGURE 4 is a part section on line 4—4 in FIGURE 2;
FIGURE 5 is a part section on line 5—5 in FIGURE 2;
FIGURE 6 is a side elevational view of a member of a frame according to the invention;
FIGURE 7 is a part section of a frame structure in another form of the present invention.

FIGURE 1 shows the lower part or bottom part of a container for the transport of particulated or powdered material, and to permit assembly with the container proper said bottom part is provided with an extreme flange 1 and a central flange 2, the bottom wall 3 of the container being welded in position between said flanges. The central flange defines the output or emptying area of the container. Two air supply pipes 4 and 5 lead from a conventional source of air under pressure to the bottom wall. The interior of the container thus is in communication with the source of air under pressure whereby air can be fed into the container to facilitate emptying thereof and fluidization of the material in the bottom area.

To make this fluidization possible and efficient air permeable means 6, preferably consisting of one or more perlon webs 7 are mounted between the mouths of the air supply pipes 4 and 5 and the interior of the container, said air permeable means covering the entire container bottom. Said webs 7 are mounted one on either side of a frame which can be placed at the container bottom, said frame being composed in this embodiment of two parts or pieces 8a and 8b (FIGURES 2 and 6) which can be put together. Each of said parts is in the shape of half the peripheral surface of a truncated cone and comprises an upper ring half 9 mounted on a part of the flange 1 which extends inwardly of the container, a lower ring half 10 mounted on the central flange 2, and straight struts or rods 11 extending between the ring halves and having one end welded to the upper ring half 9 and the other end welded to the lower ring half 10. By mounting the two frame parts 8a and 8b in the container there is thus formed a supporting surface which is sloping from the container side wall toward the output or emptying area and which after placing of the perlon webs 7 constitutes the means 6 serving to fluidize the material closest to the surface.

To achieve optimum fluidization and emptying rate the supporting surface or the air permeable means 6 must be kept as smooth as possible irrespective of the supplied air. To achieve this the webs 7 are attached to the frame 8a, 8b each on one side of said frame by means of air permeable mounting means 12 (FIGURES 3-5). About the circumference of each frame half the webs are connected together by means of a double seam 12a, and about the circumference of each grid formed by two rods 11 and the ring halves, the webs are connected together by a single seam 12b. The seams are spaced such a distance from the respective frame members that the resulting web surface will be movable to a certain extent but nevertheless sufficiently rigid so as not to bulge inwardly of the container when air is supplied through the air supply pipes 4 and 5. At such lifting movement of the web surface also the parts thereof which are situated over the frame members will be spaced from said members whereby an almost uniformly air-penetrated surface will be provided.

Soft packings (not shown) are provided between the frame members and the web parts to seal those web parts which will come to lie between the frame members 8a and 8b and between said frame members and the flanges 1 and 2, and also to protect said web parts against wear.

When the web is mounted on the frame 8 the seams 12 will prestress the web, It is readily understood that the seams can be realized in different conventional ways, for example with the aid of clamps, glue, thread or other means.

In addition to the advantages outlined in the foregoing the device according to the present invention also brings the advantage that the air permeable means can be exchanged only by way of insignificant dismounting of the container due to said means being divided into two parts. According to the principle of the present invention the air permeable means can very well be divided into a further number of parts.

FIGURE 7 shows a modification of the present invention. In this simplified construction but one perlon web 7 is clamped in a frame substantially consisting of the container bottom wall 3. The web is secured to the flange 2 by means of a ring 14, a sealing strip 15 being placed between the flange 2 and the web. From the flange 2 the web 7 extends substantially rectilinearly some distance toward the side wall of the container and is secured to the bottom wall 3 by means of a ring 16, a sealing strip 17 being interposed between the bottom wall 3 and the web. A strut or rod 18 is disposed approximately midway between the rings 14 and 16 to keep the web substantially smooth when air is supplied to the container. Said rod 18 is secured to the bottom wall 3 by means of a ring 19 to which the rod is attached by means of spaced welds so that a small clearance is formed between the rod 18 proper and the ring 19. The web is attached to the rod with the aid of web strips 20 passed through the clearances and so sewn to the web that it can lift itself slightly from the rod 18, whereby the air permeable surface will be continuous and will satisfy the above-mentioned requirements.

What we claim and desire to secure by Letters Patent is:

1. A device for fluidizing particulate material at an outlet in a container, the device comprising in combination, a frame means adapted to be placed in the container adjacent the outlet thereof, said frame means including first and second radially spaced portions and a number of rod members extending between said first and second portions, air permeable means including a number of webs for supporting particulate material, and air permeable fastening means attaching said webs to said rod members, said air permeable fastening means including loop portions on the webs received about said rod members, said loop portions being dimensioned to form a cross-section greater than that of said rod members to permit the loop portions to move relative to said rod members to provide a space between the loop portions and the rod members permitting air to pass therethrough while at the same time preventing substantial inward bulging of the webs when air is directed therein for fluidizing the particulate material in the containers.

2. The device defined in claim 1 wherein said webs include integral upper and lower members on the opposite ends thereof forming said loop portions and wherein there is further provided means fastening said upper and lower members to each other to maintain the loop portions closed.

3. The device defined in claim 1 wherein said first and second frame portions are annular flange members adapted to be fixed with respect to the container, and wherein said rod members radiate between said flange members.

4. In a container for storing particulate material and having an outlet for discharging the particulate material from the container and an inlet for supplying a fluid into the container for fluidizing the particulate material; a device comprising frame means secured to the container adjacent the outlet opening, air permeable means including an air permeable web supported on the frame means for supporting the particulate material but permitting a fluid such as air to be introduced through the web to fluidize the particulate material, and air permeable means attaching the web to said frame means to maximize the air permeable area of said web, said air permeable means including a loop member on a portion of said web, said loop member being received about a portion of said frame means and defining an area sufficiently greater than the cross section of said frame portion to permit said loop member to move a slight amount relative to said frame portion to provide a space therebetween for permitting air to pass therethrough while at the same time preventing substantial inward bulging of the web when air is directed thereon for fluidizing the particulate material in the container.

References Cited

UNITED STATES PATENTS

| 1,759,983 | 5/1930 | Houston | 302—29 |
| 3,236,422 | 2/1966 | Bailey et al. | 222—195 |

ROBERT B. REEVES, *Primary Examiner.*

N. L. STACK, JR., *Assistant Examiner.*

U.S. Cl. X.R.

302—29